(12) United States Patent
Dessertenne

(10) Patent No.: US 8,868,708 B2
(45) Date of Patent: Oct. 21, 2014

(54) METHODS AND DEVICES FOR COMMUNICATING DIAGNOSIS DATA IN A REAL TIME COMMUNICATION NETWORK

(75) Inventor: Franck Dessertenne, Colomiers (FR)

(73) Assignee: Airbus Operations S.A.S., Toulouse (FR)

( * ) Notice: Subject to any disclaimer, the term of this patent is extended or adjusted under 35 U.S.C. 154(b) by 937 days.

(21) Appl. No.: 12/666,447

(22) PCT Filed: Jun. 19, 2008

(86) PCT No.: PCT/FR2008/051104
§ 371 (c)(1),
(2), (4) Date: Dec. 23, 2009

(87) PCT Pub. No.: WO2009/007570
PCT Pub. Date: Jan. 15, 2009

(65) Prior Publication Data
US 2010/0198576 A1    Aug. 5, 2010

(30) Foreign Application Priority Data
Jun. 28, 2007    (FR) ..................... 07 56129

(51) Int. Cl.
*G06F 15/173*    (2006.01)
*H04L 29/12*    (2006.01)
*H04L 29/08*    (2006.01)

(52) U.S. Cl.
CPC ...... *H04L 29/12028* (2013.01); *H04L 61/6059* (2013.01); *H04L 67/125* (2013.01); *H04L 61/103* (2013.01); *H04L 29/12915* (2013.01)
USPC ........................................................ 709/223

(58) Field of Classification Search
CPC ............................................... H04L 29/12018

USPC .................................................. 709/223, 225
See application file for complete search history.

(56) References Cited

U.S. PATENT DOCUMENTS

2002/0112076 A1*   8/2002   Rueda et al. ................. 709/245
2003/0051026 A1*   3/2003   Carter et al. ................. 709/224
2006/0059253 A1*   3/2006   Goodman et al. ........... 709/223

FOREIGN PATENT DOCUMENTS

JP             8 237285           9/1996

OTHER PUBLICATIONS

Narten, T. et al., "Neighbor Discovery for IP Version 6 (IPv6) <draft-ietf-ipv6-2461bis-11.txt>", Internet-Draft, vol. ipv6, No. 11, pp. 1-88 (Mar. 2007) XP 015049437.

(Continued)

*Primary Examiner* — Wing F Chan
*Assistant Examiner* — Andrew Woo
(74) *Attorney, Agent, or Firm* — Oblon, Spivak, McClelland, Maier & Neustadt, L.L.P.

(57) ABSTRACT

Methods and devices for non-intrusive identification and communication between a server node and at least one client node in a communication network. An identification message is first transmitted to at least one client node, the identification message including at the application level a duplicate of the addressing data, the physical address and the internet address of the server node, also contained in the MAC and IP layers. The reception of at least one couple of addresses from at least one client node, wherein a couple of addresses from a client node includes a physical address and an internet address according to the same duplication strategy, can be used for identifying the client node by the server. Similarly, the methods and devices can be used for identifying in a client node at least one server node in the network.

16 Claims, 2 Drawing Sheets

(56) References Cited

OTHER PUBLICATIONS

Wiget, M., "Drat-Wiget-Dynamic—VPIs-00 txt: Dynamic VPLS Solution Over Multicast enabled IP backbone", Internet Draft, Total pp. 37(Dec. 1999) XP 015036853.

Plummer, D.C., "An Ethernet Address Resolution Protocol—or —Converting Network Protocol Addresses to 48.bit Ethernet Address for Transmission on Ethernet Hardware: Network Working Group Request for Comments 826", Total pp. 11 (Nov. 1982) XP 015006811.

* cited by examiner

METHODS AND DEVICES FOR COMMUNICATING DIAGNOSIS DATA IN A REAL TIME COMMUNICATION NETWORK

BACKGROUND

1. Field

This invention relates to methods and devices for identification and non-intrusive communication between a server node and several client nodes within a real time switched network.

2. Description the Related Art

A network of "switch fabric" type is based on a switched architecture, that is, the terminal equipment items responsible for the transmission and reception of data are organized around switches responsible for the transport of these data, to N inputs and N outputs. Communication is performed by the sending and reception of packets, the latter being sent out in parallel.

More generally, the invention relates, in a network for processing of data in real time comprising at least one server and at least one client, to the principles governing the communication of diagnostic data between these components of the network so as to be non-intrusive on real time communication also circulating over this same network.

The invention applies in particular in a network for simulation of components of an aircraft in real time, where a diagnosis of these components must be made without disrupting the simulation network.

Simulation of components of an aircraft is used to ensure the development and integration of on-board electronic and computer systems in aircraft, in particular prior to the first flight.

The simulation architecture comprises a plurality of terminals also called nodes of the network, each of these terminals being able to perform simulation calculations or constituting the electronic interface with the real environment, making it possible to verify the functioning of the real equipment items of the aircraft. In this way, this architecture comprises in particular a simulation terminal able to transmit data according to a synchronous sequence in accordance with a request/response principle.

Network nodes are made up of simulation computers and of electronic interface input/output cards.

Data exchange between the various nodes of the network is carried out on a specific UDP (acronym for "User Datagram Protocol" in English terminology) port and in real time, that is, the simulation of the performances of equipment items is carried out at the speed of their actual development.

In order to carry out diagnoses on such a network architecture, there can be connected to the network at any moment a diagnostic equipment item able to identify malfunctions of various nodes of the system.

Nonetheless, without a specific phase of learning the topology of the network, exchanges of messages generate an additional traffic on the network between the diagnostic equipment item and the various nodes of the network. The messages exchanged are typically of the ARP (acronym for "Address Resolution Protocol" in English terminology) type.

Such a use has the drawback that a great number of ARP messages between the diagnostic equipment item and the network nodes are transmitted, which disrupts the execution of the simulation in real time.

BRIEF SUMMARY

This invention has as an object to remedy at least one of the drawbacks of the techniques and processes of the aforementioned prior art. To accomplish this, the invention proposes in particular a method and a device for dynamic identification, in a server node, of at least one client node in a communication network and a method and a device for identification, in a client node, of a server node in a communication network able to respect considerable restraints such as non-disruption of the development of the simulation in real time.

The invention thus has as an object a method for identification, in a server node connected to a network, of at least one client node connected to the network, the method comprising the following steps, a step of transmitting an identification message to at least one client node, the identification message comprising the physical address and the Internet address of the said server node, and a step of receiving at least one message containing the pair of addresses of at least one client node in response to the step of transmitting an identification message, a pair of addresses of a client node comprising a physical address (MAC) and an Internet address (IP).

In this way, the method according to the invention makes it possible to determine the topology of the network dynamically, without needing any point-to-point connection or prior knowledge of the topological definition thereof. This method makes it possible to respect non-intrusion restraints allowing the development of simulations in real time.

Advantageously, the said at least one pair of client node addresses is stored statically in a table of correspondence between a physical address and an Internet address, such as the ARP table of the operating system, in the said server node to control the messages generated by the operating system, that is, for example, to restrain the ARP mechanisms.

According to one particular embodiment, transmission of the said identification message is carried out in multicast mode.

The invention also has as an object a method for exchange of diagnostic data in a network between a network node and a diagnostic terminal connected to the network, the method comprising the following steps, identifying at least one network node according to the identification method described above; and, transmitting a diagnostic command to the said at least one identified node of the network.

In this way the method according to the invention makes it possible to exchange diagnostic data without disrupting the real time functioning of the network while retaining standard network characteristics.

The invention also has as an object a method for identification, in a client node connected to a network, of a server node connected to the network, the method comprising the following steps, a step of receiving an identification message originating from the said server node, the identification message comprising the physical address (MAC) and the Internet address (IP) of the said server node, and a step of transmitting to the said server node a message containing the pair of addresses of the said client node in response to the step of receiving the identification message, the pair of addresses comprising a physical address (MAC) and an Internet address (IP) of the client node.

Advantageously, the said at least one pair of addresses of the server node is stored statically in a table of correspondence between a physical address and an Internet address, such as the ARP table of the operating system, in the said client node.

The invention also has as an object a method for exchange of diagnostic data, in a client node connected to a network, characterized in that it comprises the following steps, identifying at least one server node according to the identification method described above; and, activating a task of diagnosis data management upon receiving a diagnostic command according to the state of activation of a simulation data management task.

The method according to the invention thus employs a management by priority of the services for limiting intrusion of diagnostic operations on simulation operations.

Advantageously, the diagnostic data management and simulation tasks use different ports.

The invention also has as an object a computer program comprising instructions adapted for the implementation of each of the steps of the methods described above.

The invention also has as an object a device comprising means adapted for the implementation of each of the steps of the methods described above.

BRIEF DESCRIPTION OF THE DRAWINGS

Other advantages, purposes and characteristics of this invention become apparent from the detailed description that follows, presented by way of non-limitative example, with reference to the attached drawings in which.

DETAILED DESCRIPTION

In accordance with the invention, the diagnosis of a network for simulation of components, in particular avionic components, is centralized and integrated. This simulation is based on considerable real time restraints so that it is not to be disrupted in any way in order best to simulate the actual performance of the components.

The diagnosis functionalities are in particular the following:

- determining the network nodes that are present, in particular in centralized manner, that is, without having a direct point-to-point connection with each of the electronic interface equipment items used;
- monitoring in real time with the possibility of deporting the graphical interface for monitoring and diagnosis;
- establishing the mapping of the nodes of the system, in particular the list of equipment items of the network and their configuration (software, component hardware and parametrizing);
- consulting or modifying the parametrizing of the nodes of the network;
- monitoring the internal parameters and preparing statistics;
- forcing input/output paths and other parameters;
- recording parameters in real time, in particular in volatile memory;
- recording breakdown contexts, in particular in non-volatile memory;
- obtaining parametrizing, configuration, breakdown contexts and recording tables; and,
- managing advanced statistics, such as the duration of processing of simulation messages, of the IP (acronym for "Internet Protocol" in English terminology) stack and of the messages stack.

According to a specific embodiment, the diagnostic system is integrated into the simulation network and only one network connection is necessary. Moreover, the diagnostic function is centralized.

There is no charge for additional terminals and the inquiry is carried out in operating mode without disconnecting the nodes.

Figure 1:
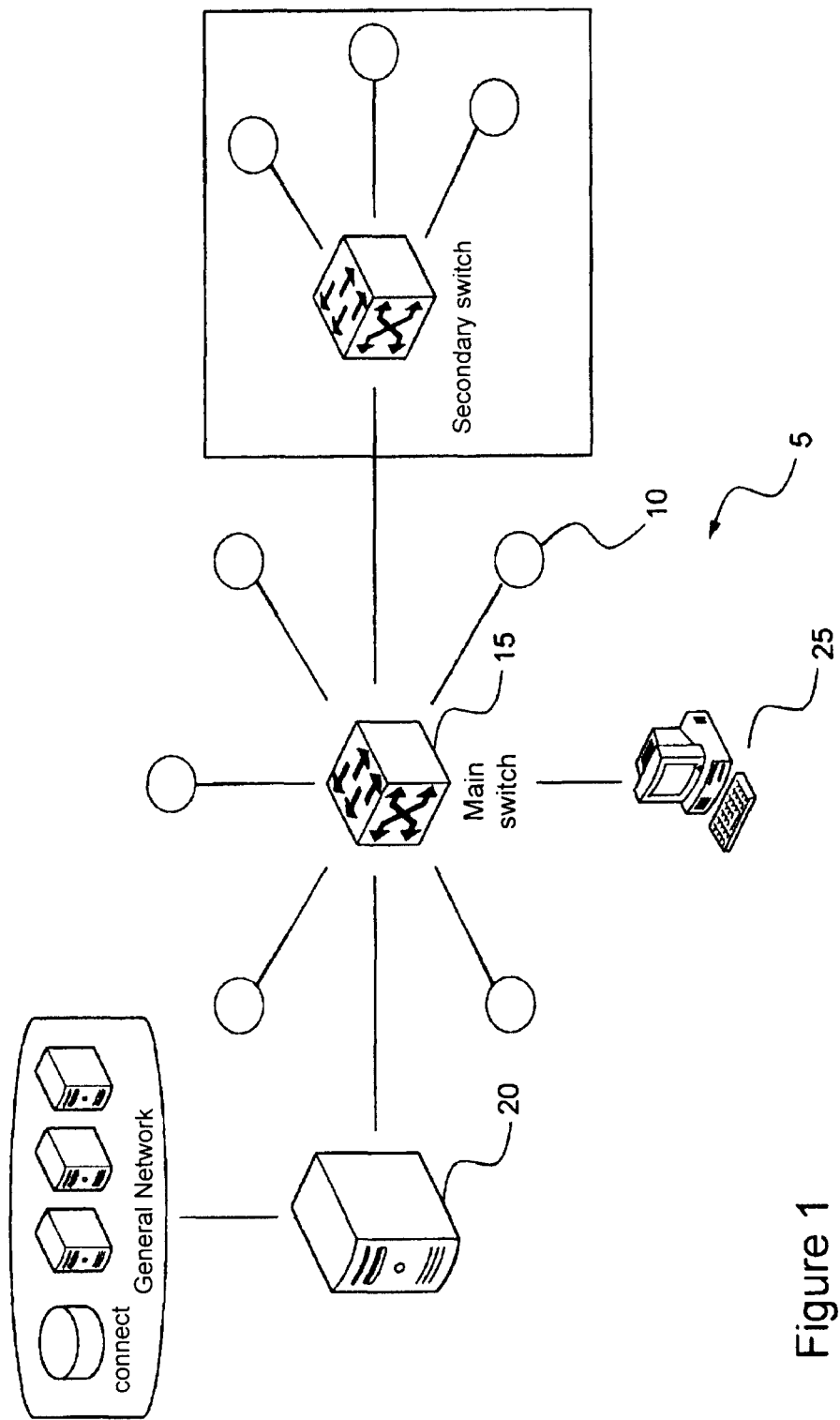
FIG. 1 illustrates a simulation network architecture integrating a diagnostic terminal according to the invention.

To accomplish this, according to one embodiment of the invention, the simulation network, illustrated in FIG. 1, comprises a series of network nodes able to function together in order to perform the simulation of components, in particular of avionic components connected to each other in a switched network of switch fabric type.

In this way, each of the nodes 10 of network 5 is connected to a main switch 15. These nodes 10 are, in particular, nodes for calculation, input/output cards, intermediate nodes and concentrators.

To this network 5 are connected a main simulation computer 20 ("host" in English terminology) on main switch 15 and a diagnostic equipment item 25.

In order to best respect real time, the network is a high-output network, for example a network of one hundred megabits per second or of one gigabit per second.

In accordance with the invention, a module, in particular a software module (called "plugin" in English terminology) is installed in various nodes of the network to be diagnosed, called client diagnostic module, and in diagnostic equipment item 25, called server diagnostic module.

This software module is a program integrated into the operating application of each node of the electronic interface.

In accordance with the invention, a specific implementation of the message layer is accomplished by relying as much as possible on the POSIX (acronym for "Portable Operating System Interface" in English terminology) programming layers of the operating system of the nodes and of diagnostic equipment item 25.

Moreover, at startup the diagnostic server equipment item must carry out learning of the topology of the network. This learning is dynamic, that is, it is achieved by querying the various nodes of the network, in particular through transmission of a specific identification message and through processing of the associated response messages.

The exchange of messages can be carried out according to a synchronous mode or an asynchronous mode (also called "TRAP" mode in English terminology).

According to a synchronous embodiment, a diagnostic request is transmitted by the diagnostic terminal (server node) and a response is transmitted by the diagnosed node (client node) at the end of the processing.

According to an asynchronous embodiment, a processing is activated by means of a unicast message, that is, according to a point-to-point mode, or a multicast mode, that is, a message intended for a group of network nodes. In this case, the obtaining of diagnostic data is carried out periodically and automatically according to a programmable period (spontaneous and periodic transmission of messages by client nodes configured in this mode).

In accordance with the invention, the intrusion of diagnoses on the real time functioning of the simulation is controlled, in particular by monitoring the transmissions of protocols of the network layer, by control of the concurrent access latency at the network interface of the nodes and by control of the induced kernel and application latency on the network nodes.

In accordance with the invention, the software modules use the standard socket application programming interface, in particular for implementation of the UDP protocol.

Moreover, on each of the nodes of the network, in particular on the nodes of electronic interfaces, a management by service is conducted in the following manner:

a task managing a specific UDP port for the simulation data. This task has maximum priority; and, a task managing a specific UDP port for the diagnostic data. This task has minimum priority.

Moreover, the fragmentation of the IP packets during transmission of messages to nodes of the network is prohibited. Any message fragmentation therefore must be carried out at the message layer so as not to burden the IP stack, in that way avoiding the risk of latency of the kernel, the latter using a semaphore (also called "mutex" for "Mutual Exclusion" in English terminology) for access to the sole network interface for each node.

Moreover, the transmission of fragmented messages is staggered temporally, for example a message by cycle, or every 10 ms if the duration of a cycle is 10 ms.

When the diagnostic equipment item seeks to send a message, in particular an Ethernet frame to a node of the network the Internet address, also called IP address, of which it knows, it queries its ARP buffer memory searching for an entry corresponding to the IP address of the target machine.

An ARP buffer memory, also called an ARP cache, is a series of pairs (IP address, physical address) contained in the memory of a computer using the ARP protocol, that is, a memory space in which there is recorded a table listing physical address—IP address correspondences of nodes of the network belonging to the same logic network. The physical address is the MAC (acronym for "Media Access Control" in English terminology) address of the network node.

If the IP address of the addressee is present in the ARP cache of the sender, the operating system provides the corresponding destination physical address for sending the Ethernet frame. In this case, the ARP mechanism stops here.

Otherwise, if the IP address is absent from the buffer memory of the sender, the diagnostic equipment items puts its transmission on hold and implements an ARP request, in particular according to the broadcast mode. This request is of the type "what is the physical address corresponding to the IP address IPaddress? Respond to Physicaladdress." Since such a request is transmitted in broadcast mode, all the nodes connected to the network through the switch receive the request. The node concerned then responds to the sender of the ARP request.

This solution has the drawback of disrupting the real time simulation network.

In order not to disrupt the real time communication of simulation data, the ARP frames generated automatically by the operating system are blocked by inserting permanent (static) inputs into the ARP buffer memory.

In this way, in accordance with the invention, the ARP buffer memory is filled by means of permanent inputs, in particular by means of a POSIX programming interface.

To accomplish this, an identification request first is transmitted in multicast mode by the diagnostic equipment item (server), in particular by the server diagnostic module, prior to any transmission of unicast messages to client nodes. This request is transmitted to an agreed-upon multicast address, on which various client nodes are subscribed for beforehand.

From the identification responses of the nodes of the network present, there are formed pairs of addresses (physical address, IP address). This is achieved, for example, by explicit duplication of the pairs (physical address, IP address) in the message layer of the identification response. In that way, the topology of the network is formed.

Moreover, each pair (physical address, IP address) is positioned as a permanent input, that is, statically in the ARP cache prior to any diagnostic message transmission, these messages being able to be requests or responses. Then, by construction, no ARP type message is transmitted by the diagnostic equipment item or by the nodes.

In the course of the diagnosis, the diagnostic equipment item, in particular the server diagnostic module, transmits messages preferably in unicast mode, multicast mode nonetheless being allowed since not generating any ARP traffic. However, in order to prevent transmission of a large number of messages that can "flood" the network and thus disrupt simulation in real time, the transmission of diagnostic message in broadcast mode is prohibited.

According to a specific embodiment on the server node, addressing in unicast mode is carried out by the diagnostic task in cyclic manner over the clients, for example one message for one client per cycle, with a time delay between each transmission.

Moreover, in asynchronous mode, an ending message of the synchronous mode is to be transmitted by the diagnostic server prior to the end of execution of the diagnostic module in order to prevent any subsequent ICMP (acronym for "Internet Control Message Protocol" in English terminology) message transmission by the clients concerned (that is, clients whose TRAP mode is activated), in particular the transmission of an "ICMP port unreachable" message. This protocol is used in order to convey control and error messages.

On the client node side of the network, the client diagnostic module activates the IGMP (acronym for "Internet Group Management Protocol" in English terminology) layer at initialization so as to manage the multicast.

Upon initialization, the client diagnostic module transmits a request for subscription for a specific agreed-upon multicast address, in particular the diagnostic IP address for configuring the table for redirection of the switch for management of multicast groups, so as to prevent transmission in broadcast mode, by the switch, of a multicast packet that it should route and that has no interface subscribed for at this address.

Moreover, in order to prevent any transmission of an ARP message, the pair of addresses (physical address, IP address) of the diagnostic equipment item (server) is obtained by the client nodes during the identification request, in particular by explicit duplication of the MAC/IP pair (physical address, IP address) in the message layer of the identification request, then is positioned as a permanent input, that is, statically, in the ARP cache prior to any diagnostic message unicast transmission.

In the course of the diagnosis, the nodes of the network, in particular the client diagnostic modules, transmit messages in unicast mode. These messages are transmitted, in synchronous mode, on reception of a request, and are transmitted periodically when the asynchronous communication mode is activated (TRAP mode).

Figure 2:
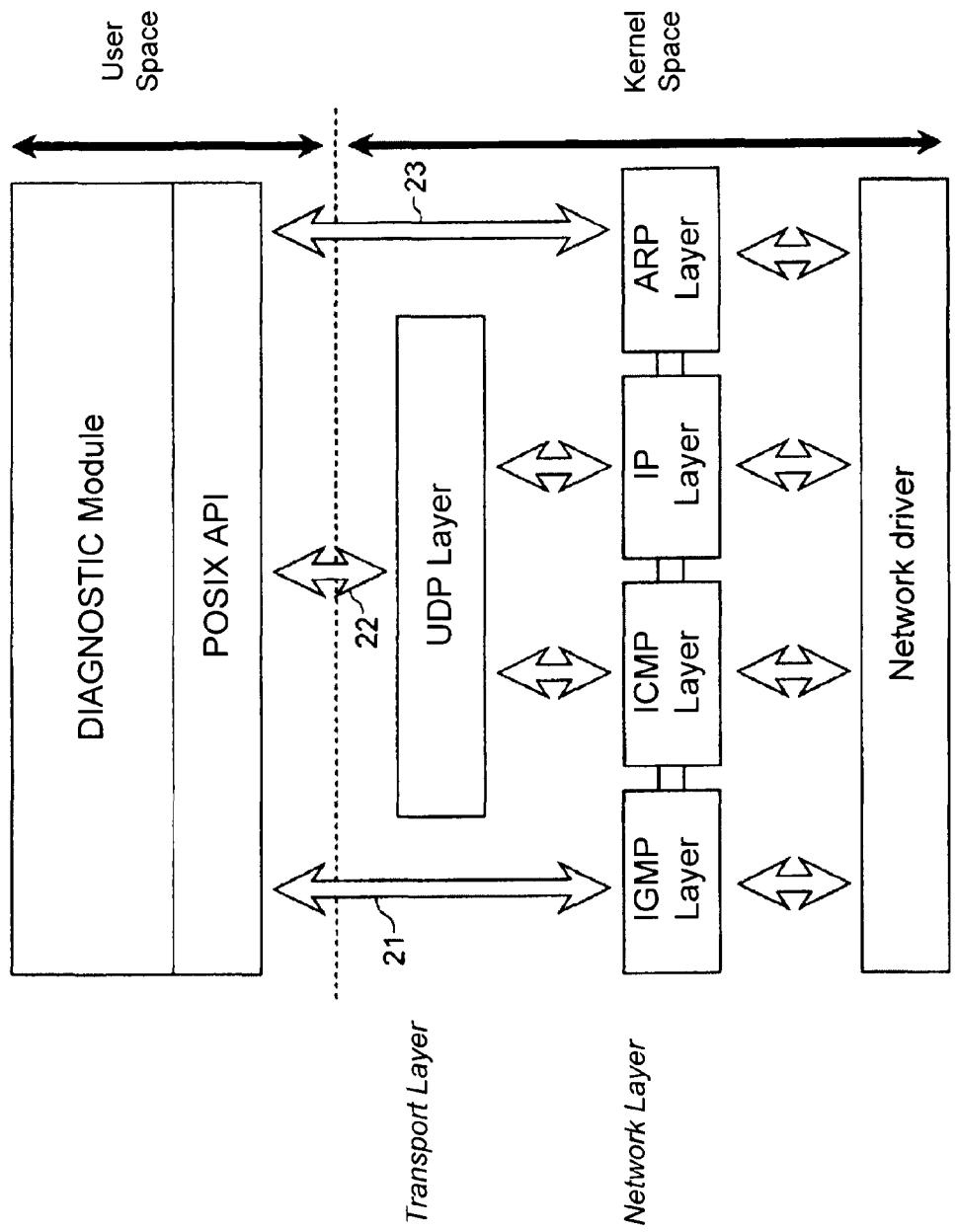
FIG. 2 shows the programming layers of the system and the interactions with the client and server diagnostic modules in accordance with the invention.

There now is described, with reference to FIG. 2, the programming layers of the system and the interactions with the client and server diagnostic modules.

The programming of the client and server diagnostic modules uses a POSIX programming interface located in the user space of the operating system.

This space is located, according to the hierarchy of communication layers, above the kernel space.

The kernel space comprises, at the lowest of the hierarchy of protocol layers, a pilot network (called "driver" in English terminology) on which a network layer rests, comprising in particular an IGMP layer, an ICMP layer, an IP layer and an ARP layer.

Above the network layer and resting on the ICMP layer or on the IP layer is the UDP layer partially forming the transport layer.

Reference 21 illustrates communication between the client diagnostic module and the IGMP layer, via the POSIX interface, in order to implement the subscription for a multicast IP address.

Reference 22 illustrates communication between the client diagnostic module or the server diagnostic module and the UDP layer, via the POSIX interface, for transmission and reception of an asynchronous message.

Reference 23 illustrates communication between the client diagnostic module or the server diagnostic module and the ARP layer, via the POSIX interface, in order to implement the addition of permanent inputs in the ARP cache.

Naturally, in order to meet specific needs, an individual skilled in the area of the invention will be able to apply modifications in the preceding description.

The invention claimed is:

1. A method for identification, in a server node connected to a network, of at least one client node connected to the network, comprising:
   transmitting an identification message to the at least one client node, the identification message comprising a physical address and an Internet address of the server node contained in an application data portion of the identification message;
   receiving at least one message containing a pair of addresses of the at least one client node in response to the transmitting the identification message, the pair of addresses comprising a physical address and an Internet address, being explicitly duplicated in the application data portion of the received message; and
   static storing of the pair of addresses contained in the application data portion of the received message in an Address Resolution Protocol (ARP) buffer in the server node, such that the pair of addresses is positioned as a permanent input to the ARP buffer prior to any diagnostic message transmission by the server node and without sending and receiving any ARP type messages.

2. A method for identification according to claim 1, wherein transmission of the identification message is carried out in a multicast mode.

3. A method according to claim 1, according to which fragmentation of the exchanged messages is carried out at a message layer.

4. A method according to claim 1, implementing UDP communication protocol and POSIX programming layer.

5. A non-transitory computer readable medium comprising computer executable instructions adapted for implementation of the method according to claim 1.

6. A method according to claim 1, further including exchange of diagnostic data in the network between the at least one client node of the network and a diagnostic terminal connected to the network, the method further comprising:
   transmitting a diagnostic command to the said at least one client node of the network.

7. A method according to claim 6, according to which fragmentation of the exchanged messages is carried out at a message layer.

8. A method according to claim 6, implementing UDP communication protocol and POSIX programming layer.

9. A non-transitory computer readable medium comprising computer executable instructions adapted for implementation of the method according to claim 6.

10. A method for identification, in a client node connected to a network, of a server node connected to the network, comprising:
    receiving an identification message originating from the server node, the identification message comprising a physical address and an Internet address of the server node contained in an application data portion of the identification message;
    static storing of the physical and Internet addresses of the server node contained in the application data portion of the received message in an Address Resolution Protocol (ARP) buffer in the client node, such that the pair of addresses is positioned as a permanent input to the ARP buffer prior to any diagnostic message transmission by the client node and without sending and receiving any ARP type messages; and
    transmitting to the server node a message containing a pair of addresses of the client node in response to the receiving the identification message, the pair of addresses of the client node, comprising a physical address and an Internet address of the client node, being explicitly duplicated in the application data portion of the transmitted message.

11. A method according to claim 10, wherein the diagnostic and simulation data management tasks use different specific ports.

12. A method according to claim 11, wherein the diagnostic and simulation data management tasks use different specific ports.

13. A method according to claim 10, implementing UDP communication protocol and POSIX programming layer.

14. A non-transitory computer readable medium comprising computer executable instructions adapted for implementation of the method according to claim 10.

15. A method according to claim 10, further including exchange of diagnostic data, in the client node connected to a network, the method comprising:
    activating a diagnostic data management task upon reception of a diagnostic command according to the state of activation of a simulation data management task.

16. A server node connected to a network, wherein at least one client node is connected to the network, comprising:
    a transmitter configured to transmit an identification message to the at least one client node, the identification message comprising a physical address and an Internet address of the server node contained in an application data portion of the identification message;
    a receiver configured to receive at least one message containing a pair of addresses of the at least one client node in response to the transmission the identification message, the pair of addresses comprising a physical address and an Internet address, being explicitly duplicated in the application data portion of the received message; and
    an Address Resolution Protocol (ARP) buffer configured to statically store the pair of addresses contained in the application data portion of the received message, such that the pair of addresses is positioned as a permanent input to the ARP buffer prior to any diagnostic message transmission by the server node and without sending and receiving any ARP type messages.

* * * * *